United States Patent [19]
Newson et al.

[11] 3,762,468
[45] Oct. 2, 1973

[54] HEAT TRANSFER MEMBERS

[76] Inventors: Ivan Henry Newson; Thomas David Hodgson, both of Didcot, England

[73] Assignee: United Kingdom Atomic Energy Authority, London, England

[22] Filed: June 28, 1971

[21] Appl. No.: 157,459

[30] Foreign Application Priority Data
June 30, 1970  Great Britain.................. 31,778/70

[52] U.S. Cl....................... 165/177, 138/38, 165/1, 165/110
[51] Int. Cl.............................. F28f 1/36
[58] Field of Search................... 165/177, 179, 184, 165/1; 138/38

[56] References Cited
UNITED STATES PATENTS
3,481,394  12/1969  Withers, Jr. ....................... 165/179
3,217,799  11/1965  Rodgers............................ 165/179
3,508,608   4/1970  Roe................................. 165/179
3,358,750  12/1967  Thomas ........................... 62/285 X
3,273,599   9/1966  Heeren........................... 165/179 X Primary Examiner—Manuel A. Antonakas
Attorney—Larson, Taylor and Hinds

[57] ABSTRACT

A special profile for the surface of a heat transfer member is described in which downwardly inclined grooves are formed with convexly curved crests whose radius of curvature decreases to a minimum at the peak where it substantially is less than the minimum radius of the adjacent troughs. A ratio of 1 : 10 is mentioned. The feature is applicable to grooves with an undercut flank on one side of the crest, useful on vertical condensing surfaces in assisting run off of condensate.

9 Claims, 7 Drawing Figures

PATENTED OCT 2 1973 3,762,468
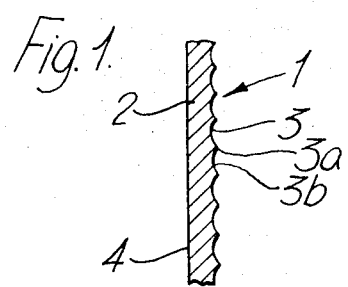
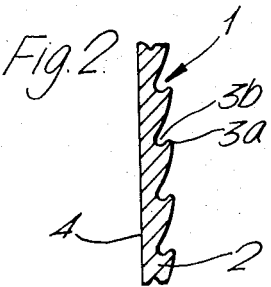
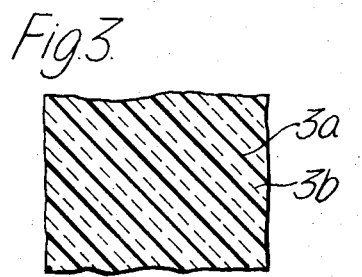
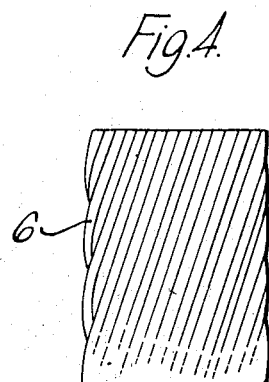
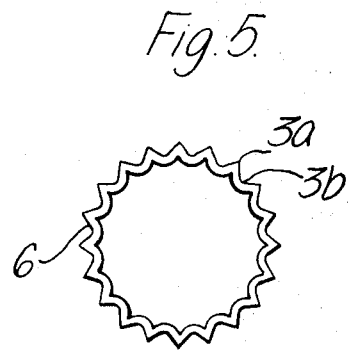
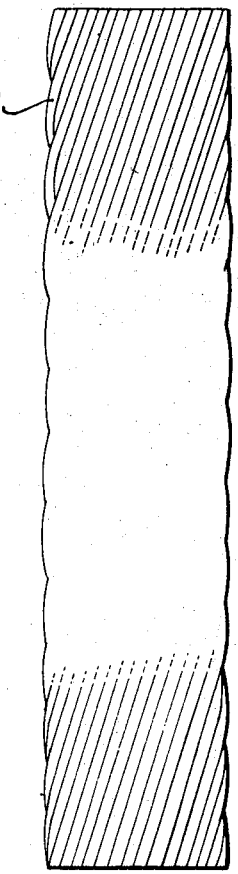

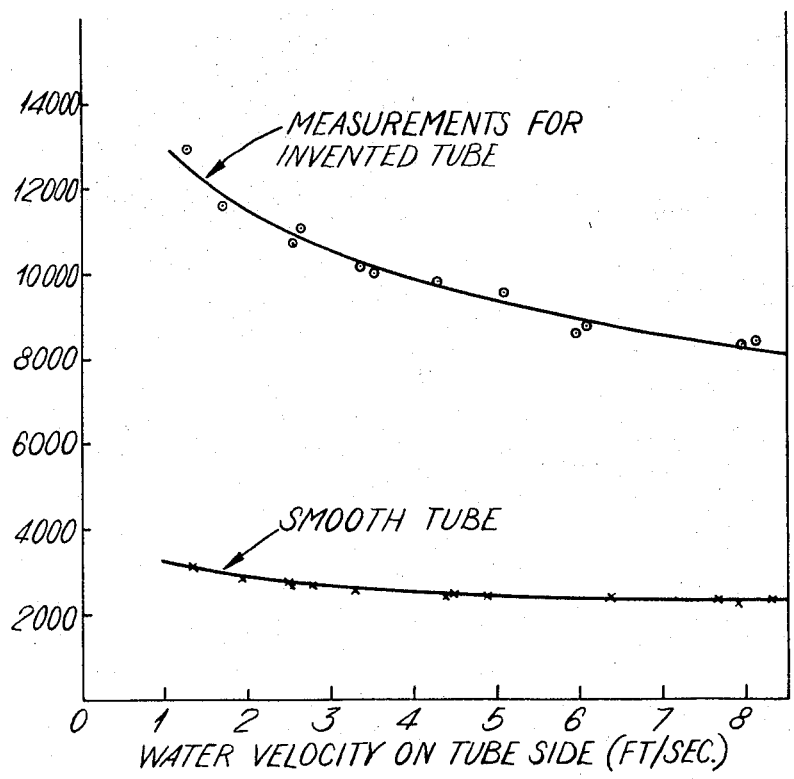

RESULTS OF VERTICAL EVAPORATIVE EXPERIMENTS.

HEAT TRANSFER MEMBERS

BACKGROUND OF THE INVENTION

This invention relates to heat exchange members which provide a flow path for the passage of a fluid in contact with the wall of the passage. The invention is mainly concerned with tubes designed for this purpose especially where one surface, usually the outer, of the member is to be employed as a condensing surface for a vapour as it, the vapour, gives heat to a fluid in the tube bore, but it is also concerned with improving the performance of evaporators. It has previously been proposed to provide a vertical condensing surface which is finely grooved so that as the condensate forms it tends to run off the crests of the grooves into the troughs between the crests leaving the crests exposed again for direct contact with the vapour.

In our study of this phenomena we have found that by profiling the surface with grooves of a certain character heat transfer coefficients, for example the heat transfer coefficient on the condensing side of a surface cooled by water flow on its other side or the overall heat transfer coefficient of a condensing/evaporating system, may be improved.

SUMMARY OF THE INVENTION

According to one aspect of the invention there is provided a heat transfer member having at least one surface for exposure to a heat transfer medium formed with a plurality of inclined grooves presenting a series of convexly curved crests and concavely curved troughs, the crests having a minimum radius of curvature at the peak thereof which is less than the minimum radius of curvature at the trough, the wall thickness of said member being substantially uniform throughout.

In a more particular form the invention provides a heat transfer member comprising a tube having its outer surface formed with multistart helical grooves which present a series of outwardly facing crests and troughs, the radius of curvature of the crests diminishing to a minimum at the peak of the crests whereat the radius is less than the minimum radius of curvature at the bottom of the trough, the tube wall being of substantially uniform thickness throughout its circumference so that a substantially complementary profile appears in the tube bore. Preferably the profile of the crestsand troughs are slightly asymmetrical. The grooves may be formed as a multistart helix having between 10 and 25 starts.

The heat transfer tube may be employed with the helical grooves presented as a condensing surface for vapour or an evaporating surface for liquid or liquid films. A single tube may be made having on its outer surface a plurality of helical grooves presenting outward facing crests and troughs the radius of curvature of the crests being greater than that of the troughs and the face of the tube bore having helical grooves of complementary profile to those on the outer surface. Such a tube has proved usefully advantageous as a condensing-/evaporating heat transfer member with the outer surface of the tube forming the condensing surface. It is the outer surface which, with the tube axis being preferably disposed vertical, contains the grooves which extend downwardly and exhibit alternately crests and troughs, the crests being of smaller radius than that of the troughs so that the condensate film forming on the crests runs off them into adjacent lower grooves. By the generally described shaping of the crests and grooves, a vapour condensing on any given crest forms a liquid film which runs off into the adjacent trough and it is preferred that the shape of the groove is such that the condensate runs preferentially downwards along the trough rather than on and over the crest of the next lower groove.

It may be thus ensured that the condensate film is quickly cleared from a large proportion of the condenser surface.

Following this concept of the invention further it is also acceptable to form the profile of the helical grooves so that they are of asymmetrical profile and each peak of the crests is slightly undercut on one flank to form a condensate trap, such that with the condensing surface vertical or nearly so the downwardly inclined grooves form channels bounded by the groove trough and the upwardly inclined or directed crest.

Conveniently the condensing surface is the periphery of a tube and this component lends itself to external forming of grooves of the profile defined above by a gear forming operation as described in commonly assigned co-pending U.S. Pat. application Ser. No. 115,393 (Lindsay). The condensing surface could equally well be of sheet form. However, in the tube form, the present invention is applied by making multistart helical grooves in the tube periphery with a large number of starts say between 10 and 25, but 16 to 20 starts would be the preferred number.

Accordingly a vertical condensing surface has its condensing coefficient improved by forming therein a plurality of parallel grooves extending in a downwardly inclined direction, the grooves having been formed by an operation which leaves the radius of the crests smaller than that of the troughs. In general the sharper the peaks are the better the performance of the condensing surface.

Regarding the difference in radii of curvature of the crests and the adjacent troughs it is considered that an appropriate ratio of crest to trough radii is about 1 to 10 although in some cases the crest radius may be reduced considerably compared with the trough radius, e.g., where there are few starts in the multistart helix grooves.

DESCRIPTION OF THE DRAWINGS

Condensing surfaces which embody the present invention will now be described with reference to the accompanying diagrammatic drawings in which:

FIGS. 1 and 2 show typical profiles of a condensing surface in cross section normal to the plane of the surfaces;

FIG. 3 shows the profiles of FIG. 2 applied to a sheet condensor surface;

FIG. 4 shows the invented profile applied to a tube external view;

FIG. 5 shows an end view of the tube shown in FIG. 4;

FIG. 6 is a graph which shows comparative performance for a smooth walled tube and a tube profiled in accordance with the present invention operating as condenser tubes over a range of cooling water velocities;

DESCRIPTION OF THE PREFERRED EMBODIMENTS

Figure 7:
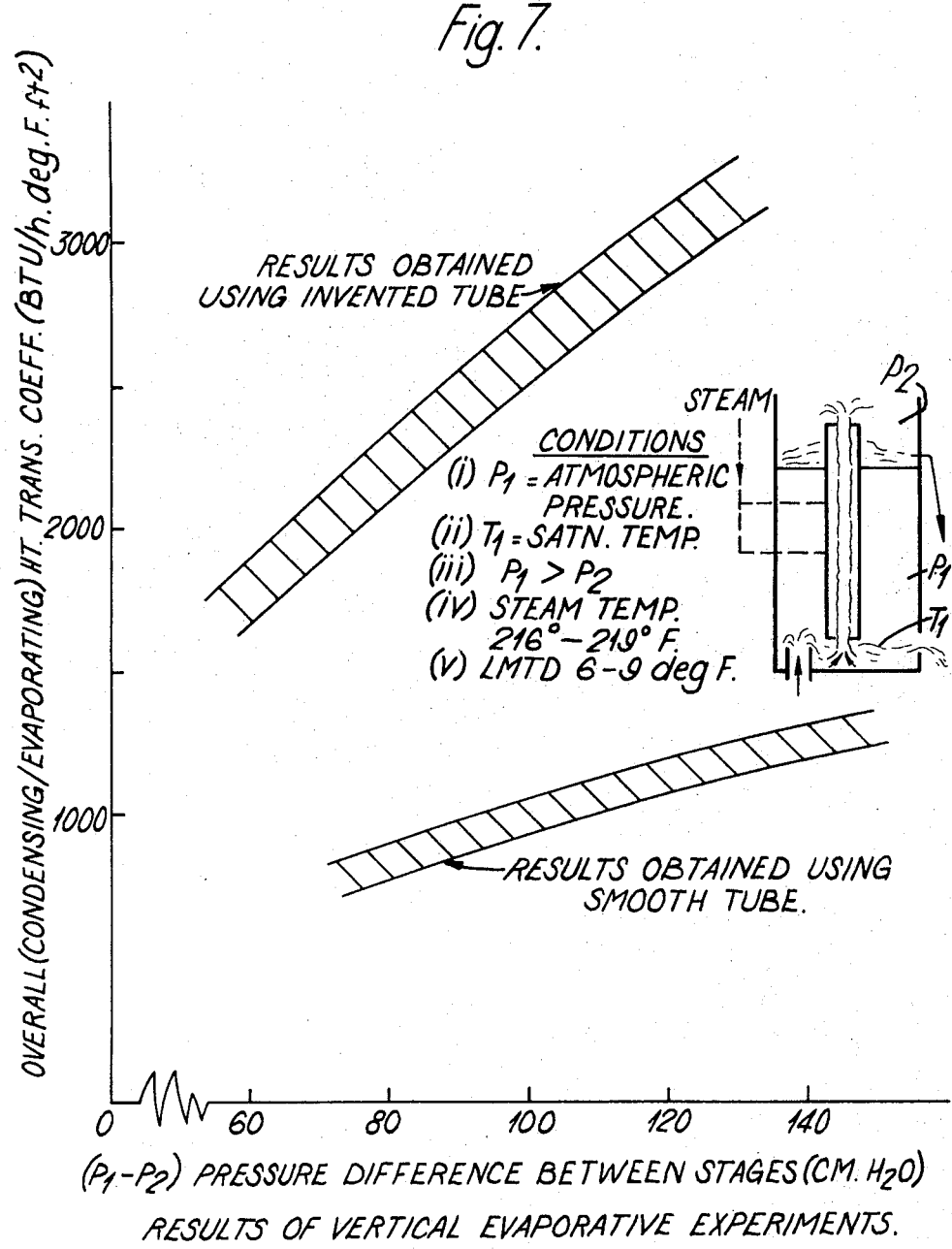
FIG. 7 is a plot showing the performance of a heat transfer member incorporating the invention in a condensing/evaporating mode.

In the drawings at FIG. 1 the condensing surface 1 of a heat transfer member 2 is formed with a number of downwardly inclined parallel grooves 3. The grooves 3 present a series of crests 3a and troughs 3b to a vapour to be condensed and coolant is passed over the obverse surface 4 which may be specially profiled, or complementarily grooved or, as shown here, plain. It will be seen that the crests 3a are formed of small radius or curvature and are, in fact, quite sharp whilst the troughs 3b are of a larger radius or curvature, than the crests. The effect of this profile is that, as a film of condensate forms, the surface tension in the film over the troughs will be greater than that in the film over the crests, with the result that the film on the crests is drawn off into the adjacent troughs. Once in the troughs the liquid runs off the surface along the troughs. The crests are quickly cleared of the liquid film and so are able to operate with a high heat transfer efficiency to condensate vapour and remove the condensate, i.e., they are quickly cleared of the insulating liquid film.

This effect of surface tension forces may be further enhanced by forming the grooves as a series of grooves of asymmetrical shape as shown in FIG. 2 where the crests are shown to be deliberately undercut.

It is one or other of these profiles which is applied to the outside of a copper tube 6 in FIGS. 4 and 5. In FIG. 4 a condenser tube 4 having a nominal outer diameter measurement of 1.25 inches is shown formed externally with a 16 start helical groove extending along the effective length of the tube between plane end portions. The grooves have a helix lead of 7.6 inches and the depth of the grooves was 0.050 inches, the minimum radius in inches of the crests was 0.004 and that of the trough was 0.040. The condensing coefficient was measured and compared with that of a comparable smooth walled tube. A significant increase in performance by the profiled tube was noted. Methods by which the grooves are formed include machining, extrusion through suitable dies or rolling and seaming ribbed metal sheet.

When made by these latter operations the tube bore may be left smooth. Alternatively the bore may be given any desired profile or as in FIG. 5 may retain that profile imparted to it by forming the outside profile. Alternatively, the tube profiling may be formed by the gear forming method described in commonly assigned co-pending U.S. application No Ser. No. 115,393 (Lindsay) in which case the tube bore becomes deformed with grooves complimentary to those on the condensing surface.

A comparison was made of the condensing side heat transfer coefficients of condenser tubes having respectively conventional smooth walls and profiled walls whose configuration followed the above conditions. Steam was condensed on the outer surface of the tube under atmospheric conditions and the mean temperature difference was 11° F between the cooling water flowing in the tube bore and the steam. The profiled tube was formed by a process which left a configuration of grooves on the bore wall which were complementary to those on the tubes outer surface. The results of such comparative performance are indicated in FIG. 6 and these indicate a substantially higher heat transfer coefficient obtainable with the invented tube.

FIG. 7 illustrates experimental results of a condensing/evaporating process employing as alternatives smooth walled tubes and tubes with multistart helical grooves formed in the tube wall by an upsetting method which left the outer surface of the tube with adjacently lying crests and grooves whose ratio of curvature radius to radius were about 1 to 10. The forming method produced complementary grooves in the tube bore, the grooves having a crest radius to trough radius of about 10 to 1. The tubes were open ended and were mounted separately in apparatus representing in effect one stage of multistage climbing film evaporator plant. That is in each case the tube depended from a tube plate mounted in the upper part of a chamber so that the bottom end of the tube was in communication with liquid at a temperature T1 to be evaporated which was passed across the floor of the chamber in which the pressure was atmospheric. A steam jacket shrouded the tube and the tube heated by condensing steam on its outer surface. With the pressure P2 above the tube plate below atmospheric, a climbing film of liquid is induced to form on the bore wall. The results for different pressure differences (P1 − P2) are shown in FIG. 7 and indicate a marked improvement obtainable with invented tube.

The undercut profile shown in FIG. 2 is especially advantageous in that, in addition to the effect of surface tension forces, the grooves themselves form traps for condensate (owing to the vertical disposition of the tube with the crests whose peaks are upwardly directed). The condensate then runs off along the grooves and the risk of the liquid spilling over the crests, so as to wet the whole tube exterior, is reduced.

In accordance with the above examples, the invention provides a heat transfer member having a surface for exposure to a heat transfer medium formed with a plurality of inclined grooves presenting crests having a radius of curvature which diminishes at the peak of the crest and being less than the minimum radius of curvature of the trough. This is demonstrated for example in FIG. 5 where a tubular heat transfer member is shown having helical grooves in which the radius of curvature on the crests diminishes towards the peaks and the peak radius is less than the minimum radius at the trough. This is shown to produce rather a spikey profile towards the apex of crests, i.e., the radius of curvature diminishes sharply at the peaks.

Of course the profile of the tube bore may be varied to suit the liquid which is passed through it and in the context the use of the tube falls to be considered. The enhanced heat transfer given by the invention favours its use in steam/water heat transfer, for example for feed water heating in a commercial power plant with the cooler fluid being within the tube bore. Where the fluid in the tube is viscous, for example viscous oils, the profile is stronger in terms of turbulence or vortex flow provoking characteristics and as such the invention finds application in a variety of petrochemical industries. The range of liquids which may receive heat from the tube wall extends to the less viscous however. Besides feed water heating for steam raising plant, feed heating for other chemical or industrial processes may employ the tubes herein described.

Condensing surfaces in accordance with the invention are amenable to use in a wide range of applications, notably in evaporator plants as used for desalination and in the food and chemical industries.

In the case of desalination such condensing surfaces may be employed with advantage for the condenser tubes of a plant of the flash type and for the preheater tubes in plants of the multieffect type.

In the food and chemical industries such condensing surfaces may serve in similar roles in the concentration of solutions, residues and similar products.

We claim:

1. A heat transfer member having at least one surface for exposure to a heat transfer medium formed with a plurality of inclined grooves presenting a series of convexly curved crests and concavely curved troughs, the crests having a minimum radius of curvature at the peak thereof which is less than the minimum radius of curvature at the trough, the wall thickness of said member being substantially uniform throughout.

2. A heat transfer member as claimed in claim 1 in which the radius of curvature of the crest diminishes sharply at the apex thereof such that at that location it is less than the minimum radius at the troughs.

3. A heat transfer member as claimed in claim 1, wherein said member is a tube having a plurality of helical grooves in the outer wall thereof presenting outwardly facing crests and troughs in which the ratio of the radii of curvature of the crests to troughs is about 1 to 10 and whose bore wall is formed with complementary grooves having adjacent inward facing troughs and crests of which the ratio of the radii of the curvature of the crests to the troughs is about 10 to 1.

4. A heat transfer member comprising a tube having its outer surface formed with multistart helical grooves which present a series of outwardly facing crests and troughs, the radius of curvature of the crests diminishing to a minimum at the peak of the crests where at the radius is less than the minimum radius of curvature at the bottom of the trough, the tube wall being of substantially uniform thickness throughout its circumference so that a substantially complementary profile appears in the tube bore.

5. A heat transfer member as claimed in claim 4 in which the helical grooves are formed as a multistart helix of between 10 and 25 starts.

6. A heat transfer member as claimed in claim 4 and having helical grooves formed as a multistart helix of between 16 and 20 starts.

7. A heat transfer member as claimed in claim 4 having one face thereof adapted for condensing vapour thereon, said face being disposed vertically and containing grooves extending vertically downwards and exhibiting alternately crests and troughs the crests being formed in relation to the troughs such that condensate film forming on the crests runs off into the adjacent lower trough and wherein due to the shape of the groove it runs preferentially downwards along the trough rather than on to the crest of the next lower groove, the member being of substantially uniform thickness.

8. A heat transfer member as claimed in claim 7 in which at least some of the grooves are formed of asymmetrical profile so that each crest is slightly undercut on one flank to form a condensate trap formed by the downwardly inclined grooves presenting upwardly directed crests.

9. A heat transfer member comprising a tube as claimed in claim 4 adapted for climbing film evaporator tube and comprising a helically grooved bore connected to receive in the lower region thereof a liquid to be evaporated, means supporting the tube vertically in a condensing vapour whereby heat is transferred from the condensing vapour to heat and evaporate the liquid within the tube bore.

* * * * *